(12) United States Patent
Namba et al.

(10) Patent No.: US 11,139,494 B2
(45) Date of Patent: Oct. 5, 2021

(54) FUEL CELL SYSTEM AND METHOD OF CONTROLLING THE SAME

(71) Applicant: TOYOTA JIDOSHA KABUSHIKI KAISHA, Toyota (JP)

(72) Inventors: Ryoichi Namba, Okazaki (JP); Tomotaka Ishikawa, Nagoya (JP); Yoshikatsu Fujimura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 159 days.

(21) Appl. No.: 16/154,314

(22) Filed: Oct. 8, 2018

(65) Prior Publication Data

US 2019/0140291 A1 May 9, 2019

(30) Foreign Application Priority Data

Nov. 9, 2017 (JP) .............................. JP2017-216004

(51) Int. Cl.
*H01M 8/04537* (2016.01)
*H01M 8/22* (2006.01)
(Continued)

(52) U.S. Cl.
CPC ..... *H01M 8/04559* (2013.01); *H01M 8/0267* (2013.01); *H01M 8/043* (2016.02); *H01M 8/0488* (2013.01); *H01M 8/04089* (2013.01); *H01M 8/04388* (2013.01); *H01M 8/04619* (2013.01); *H01M 8/04753* (2013.01); *H01M 8/10* (2013.01); *H01M 8/222* (2013.01); *H01M 2008/1095* (2013.01); *H01M 2250/20* (2013.01)

(58) Field of Classification Search
CPC ......... H01M 2250/20; H01M 8/04388; H01M 8/04559; H01M 8/0488; H01M 8/04089; H01M 8/10; H01M 2008/1095; H01M 8/04753; H01M 8/0267; H01M 8/04619; H01M 8/043; H01M 8/222
USPC ...................................................... 429/432
See application file for complete search history.

(56) References Cited

U.S. PATENT DOCUMENTS

2009/0123797 A1 5/2009 Kaye et al.
2010/0261084 A1 10/2010 Yoshida et al.
2015/0303500 A1* 10/2015 Son .................... H01M 8/04753
429/432

FOREIGN PATENT DOCUMENTS

CN 101842929 A 9/2010
JP 2008-293708 A 12/2008
(Continued)

OTHER PUBLICATIONS

U.S. Appl. No. 16/142,624, filed Sep. 26, 2018.

*Primary Examiner* — Jonathan G Jelsma
*Assistant Examiner* — Omar M Kekia
(74) *Attorney, Agent, or Firm* — Finnegan, Henderson, Farabow, Garrett & Dunner, LLP

(57) ABSTRACT

A controller of a fuel cell system performs cathode gas supply control to raise an average cell voltage of a fuel cell stack by increasing supply of cathode gas to the fuel cell stack, when electric power required to be generated by the fuel cell stack is equal to zero, and the average cell voltage is lower than a predetermined target voltage. Under the cathode gas supply control, the controller sets the target voltage when a predetermined condition indicating that crossleak is likely to occur is satisfied, to a value higher than a reference target voltage as the target voltage in the case where the condition is not satisfied.

4 Claims, 6 Drawing Sheets

(51) Int. Cl.
*H01M 8/04746* (2016.01)
*H01M 8/0267* (2016.01)
*H01M 8/10* (2016.01)
*H01M 8/04089* (2016.01)
*H01M 8/04858* (2016.01)
*H01M 8/043* (2016.01)
*H01M 8/0438* (2016.01)
*H01M 8/1018* (2016.01)

(56) References Cited

FOREIGN PATENT DOCUMENTS

| | | |
|---|---|---|
| JP | 2009-110848 A | 5/2009 |
| JP | 2010-103063 | 5/2010 |
| JP | 2012-227008 | 11/2012 |
| JP | 2014-192033 | 10/2014 |
| JP | 2016-136496 | 7/2016 |

* cited by examiner

FUEL CELL SYSTEM AND METHOD OF CONTROLLING THE SAME

INCORPORATION BY REFERENCE

The disclosure of Japanese Patent Application No. 2017-216004 filed on Nov. 9, 2017 including the specification, drawings and abstract is incorporated herein by reference in its entirety.

BACKGROUND

1. Technical Field

The disclosure relates to a fuel cell system and a method of controlling the fuel cell system.

2. Description of Related Art

In a fuel cell system, when a gas passage is blocked with water produced (namely, when flooding occurs), a voltage value of each unit cell (which will be called "cell voltage") is reduced, as known in the art. In a fuel cell system described in Japanese Unexamined Patent Application Publication No. 2012-227008 (JP 2012-227008 A), when the lowest cell voltage becomes lower than a predetermined value, the amount of cathode gas supplied to the cells is increased, so as to eliminate the flooding, and thus recover the cell voltage.

SUMMARY

In the meantime, when a fuel cell stack is not required to generate electric power, it is common to reduce the flow rate of cathode gas supplied to the fuel cell stack, or stop the supply. If permeation of anode gas to the cathode side (so-called "crossleak") occurs, in a condition where the flow rate of cathode gas supplied is reduced, the cell voltage drops. The inventors of this application found that, if crossleak occurs during a period immediately after the fuel cell stack ceases to be required to generate electric power, and the flow rate of cathode gas supplied is reduced, the gas pressure on the cathode side is reduced, and the cell voltage is rapidly reduced accordingly. In this case, even if the flow rate of cathode gas supplied is increased after detection of the crossleak, the cell voltage cannot be recovered in time, and may be reduced sharply to a voltage at which the cells deteriorate. Thus, a technology for preventing the cell voltage from being excessively reduced is desired.

A first aspect of the disclosure is concerned with a fuel cell system including a fuel cell stack having a plurality of unit cells, an anode gas supply unit that supplies anode gas to the fuel cell stack, a cathode gas supply unit that supplies cathode gas to the fuel cell stack, a voltage detector that detects a voltage of the fuel cell stack, and a controller that controls the anode gas supply unit and the cathode gas supply unit. The controller performs cathode gas supply control to raise an average cell voltage of the fuel cell stack by increasing supply of the cathode gas to the fuel cell stack by the cathode gas supply unit, when electric power required to be generated by the fuel cell stack is equal to zero, and the average cell voltage is lower than a predetermined target voltage. Under the cathode gas supply control, the controller determines whether a predetermined condition indicating that crossleak is likely to occur is satisfied, and sets the target voltage when the predetermined condition is satisfied, to a value that is higher than a reference target voltage as the target voltage in a case where the predetermined condition is not satisfied. The crossleak represents permeation of the anode gas from an anode electrode to a cathode electrode in each of the unit cells. With the fuel cell system thus configured, the cathode gas supply control is performed by setting the target voltage to a high value when the crossleak occurrence condition is satisfied. Thus, the flow rate of cathode gas supplied is increased at an earlier point in time, and the cell voltage can be made less likely or unlikely to be excessively reduced.

The fuel cell system may further include a pressure measuring unit that measures an anode gas pressure of the fuel cell stack. The predetermined condition may include a condition that the anode gas pressure is higher than a predetermined threshold pressure. With the fuel cell system thus configured, it is possible to easily detect a condition where crossleak is likely to occur.

Under the cathode gas supply control, the controller may set the target voltage to a higher value when the anode gas pressure is higher than the threshold pressure, than the target voltage in a case where the anode gas pressure is lower than the threshold pressure. With the fuel cell system thus configured, the cell voltage can be effectively made less likely or unlikely to be excessively reduced.

The predetermined condition may include a condition that the electric power required to be generated by the fuel cell stack immediately before the required electric power is reduced to zero is equal to or large than a predetermined threshold power. With the fuel cell system thus configured, it is possible to easily detect a condition where crossleak is likely to occur.

A second aspect of the present disclosure relate to a method of controlling a fuel cell system having a fuel cell stack having a plurality of unit cells. The method includes performing cathode gas supply control to raise an average cell voltage of the fuel cell stack by increasing supply of cathode gas to the fuel cell stack, when electric power required to be generated by the fuel cell stack is equal to zero, and the average cell voltage is lower than a predetermined target voltage. Under the cathode gas supply control, it is determined whether a predetermined condition indicating that crossleak is likely to occur is satisfied, and the target voltage is set when the predetermined condition is satisfied, to a value that is higher than a reference target voltage as the target voltage in a case where the predetermined condition is not satisfied. The crossleak representing permeation of anode gas from an anode electrode to a cathode electrode in each of the unit cells of the fuel cell stack.

The disclosure can be implemented in various forms. For example, the disclosure may be implemented in the form of a power generation apparatus including the fuel cell system, a vehicle including the fuel cell system, and so forth.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
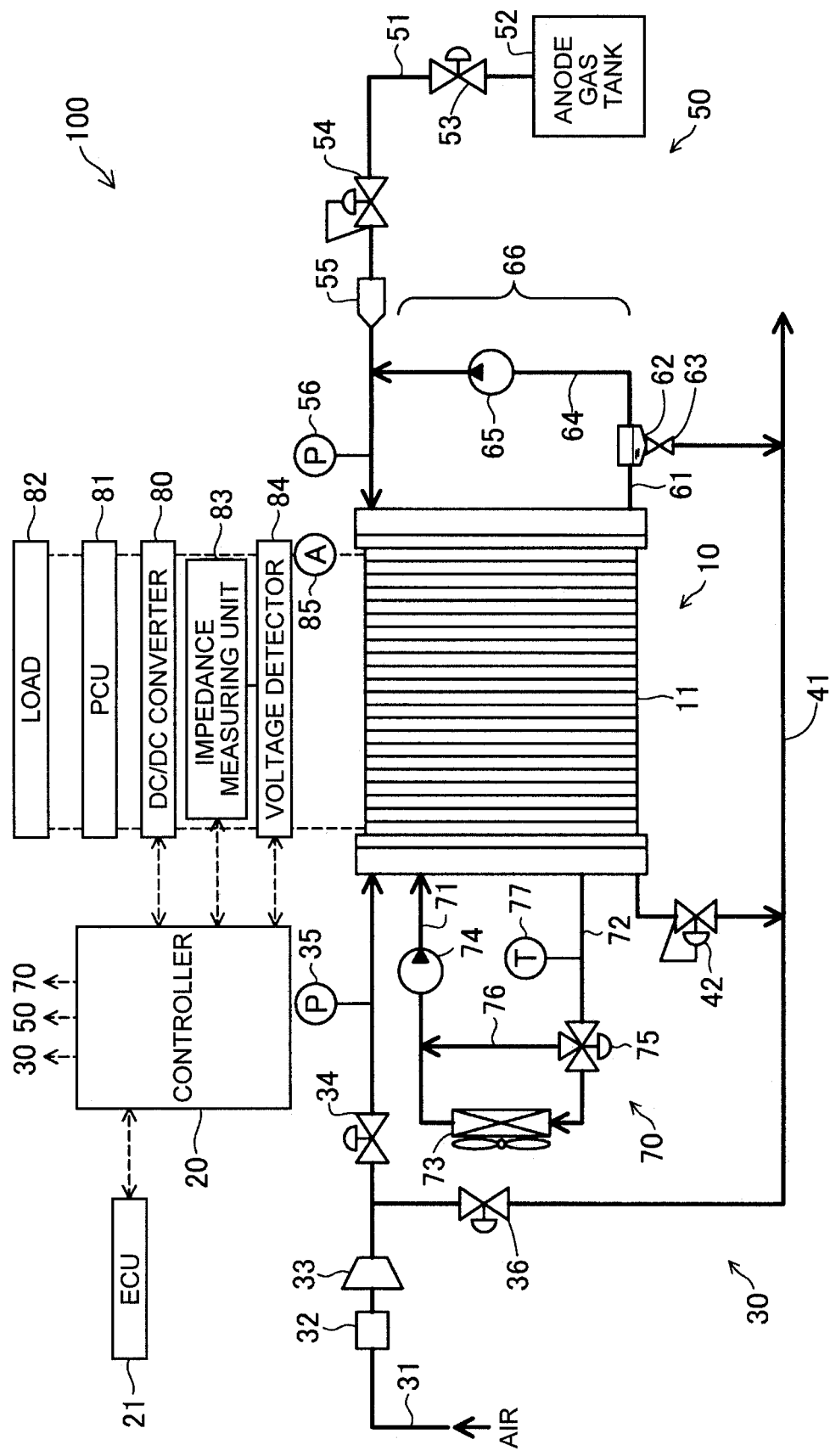
FIG. 1 is a schematic view schematically showing the configuration of a fuel cell system.

FIG. 1 schematically shows the configuration of a fuel cell system 100 according to one embodiment of the disclosure. The fuel cell system 100 includes a fuel cell stack 10, controller 20, cathode gas supply unit 30, anode gas supply unit 50, and cooling medium circulating unit 70. The fuel cell system 100 also includes a DC/DC converter 80, power control unit (which will be referred to as "PCU") 81, load 82, impedance measuring unit 83, and voltage detector 84. The fuel cell system 100 of this embodiment is installed on a fuel cell vehicle, for example.

The fuel cell stack 10 is a polymer electrolyte fuel cell that is supplied with anode gas (e.g., hydrogen gas) and cathode gas (e.g., air) as reaction gases, to generate electric power. The fuel cell stack 10 is composed of a plurality of unit cells 11 stacked together. Each unit cell 11 has a membrane electrode assembly (not shown) in which an anode electrode (not shown) and a cathode electrode (not shown) are disposed on opposite surfaces of an electrolyte membrane (not shown), and a pair of separators (not shown) between which the membrane electrode assembly is sandwiched.

The controller 20 is configured as a computer including a central processing unit (CPU), a memory, and an interface circuit to which respective components that will be described later are connected. The controller 20 outputs a signal for controlling start and stop of each device in the fuel cell system 100, according to a command of an electronic control unit (ECU) 21. The ECU 21 is a controller that controls the whole apparatus (e.g., vehicle) including the fuel cell system 100. In the fuel cell vehicle, for example, the ECU 21 controls the vehicle, according to a plurality of input values, such as the amount of depression of an accelerator pedal, the amount of depression of a brake pedal, and the vehicle speed. The ECU 21 may be included as a part of the functions of the controller 20. The CPU executes control programs stored in the memory, so as to control power generation by the fuel cell system 100, and implement cathode gas supply control that will be described later.

The cathode gas supply unit 30 includes a cathode gas pipe 31, air flow meter 32, air compressor 33, first shutoff valve 34, pressure gauge 35, shunt valve 36, cathode offgas pipe 41, and first regulator 42. The cathode gas pipe 31 is connected to the fuel cell stack 10, and supplies air taken in from the outside, to the fuel cell stack 10.

The air flow meter 32 is provided in the cathode gas pipe 31, and measures the flow rate of air taken into the cathode gas pipe 31. The air compressor 33 compresses air taken in from the outside, according to a control signal from the controller 20, and supplies the compressed air as cathode gas, to the fuel cell stack 10. The first shutoff valve 34 is provided between the air compressor 33 and the fuel cell stack 10. The pressure gauge 35 measures the pressure (which will be referred to as "cathode gas pressure") at a cathode gas inlet of the fuel cell stack 10, and sends the result of measurement to the controller 20. The shunt valve 36 is provided between the air compressor 33 and the cathode offgas pipe 41, and adjusts the flow rates of air into the fuel cell stack 10 and the cathode offgas pipe 41.

The cathode offgas pipe 41 discharges cathode offgas discharged from the fuel cell stack 10, to the outside of the fuel cell system 100. The first regulator 42 controls the pressure at a cathode gas outlet of the fuel cell stack 10, according to a control signal from the controller 20.

The anode gas supply unit 50 includes an anode gas pipe 51, anode gas tank 52, second shutoff valve 53, second regulator 54, injector 55, pressure gauge 56, anode offgas pipe 61, gas-liquid separator 62, air-water discharge valve 63, circulation pipe 64, and anode gas pump 65. In the following description, a passage including a portion of the anode gas pipe 51 located downstream of the injector 55, passage of anode gas in the fuel cell stack 10, anode offgas pipe 61, gas-liquid separator 62, circulation pipe 64, and anode gas pump 65, will be called "circulation passage 66". The circulation passage 66 is a passage through which anode offgas of the fuel cell stack 10 is circulated back to the fuel cell stack 10.

The anode gas tank 52 is connected to an anode gas inlet of the fuel cell stack 10 via the anode gas pipe 51, and supplies anode gas to the fuel cell stack 10. The second shutoff valve 53, second regulator 54, injector 55, and pressure gauge 56 are provided in the anode gas pipe 51, in this order as viewed from the upstream side, namely, from the side closer to the anode gas tank 52.

The second shutoff valve 53 is opened and closed according to a control signal from the controller 20. When the fuel cell system 100 is stopped, the second shutoff valve 53 is closed. The second regulator 54 controls the pressure of hydrogen at the upstream side of the injector 55, according to a control signal from the controller 20. The injector 55 is an electromagnetically driven shutoff valve having a valve body that is electromagnetically driven, according to a drive cycle and a valve-opening period set by the controller 20. The controller 20 controls the flow rate of anode gas supplied to the fuel cell stack 10, by controlling the drive cycle and valve-opening period of the injector 55. The pressure gauge 56 measures the pressure at the anode gas inlet of the fuel cell stack 10, and sends the result of measurement to the controller 20. The pressure gauge 56 may be provided at an anode gas outlet side of the fuel cell stack 10. In this case, the above-mentioned pressure gauge 35 is also preferably provided at the cathode gas outlet side of the fuel cell stack 10. In either case, the pressure measured by the pressure gauge 56 may be called "anode gas pressure". The pressure gauge 56 may also be called "pressure measuring unit".

The anode offgas pipe 61 connects the anode gas outlet of the fuel cell stack 10, with the gas-liquid separator 62. The anode offgas pipe 61 leads anode offgas including hydrogen gas and nitrogen gas that were not used in power generation reaction, to the gas-liquid separator 62.

The gas-liquid separator 62 is connected between the anode offgas pipe 61 and circulation pipe 64 of the circulation passage 66. The gas-liquid separator 62 separates water as an impurity, from the anode offgas in the circulation passage 66, and stores the water therein.

The air-water discharge valve 63 is provided below the gas-liquid separator 62. The air-water discharge valve 63 discharges water stored in the gas-liquid separator 62, and discharges unnecessary gas (mainly, nitrogen gas) in the gas-liquid separator 62. During operation of the fuel cell system 100, the air-water discharge valve 63 is normally closed, and is opened and closed according to a control signal from the controller 20. In this embodiment, the air-water discharge valve 63 is connected to the cathode offgas pipe 41, and the water and unnecessary gas discharged via the air-water discharge valve 63 are discharged to the outside, through the cathode offgas pipe 41.

The circulation pipe 64 is connected to a portion of the anode gas pipe 51 located downstream of the injector 55. The anode gas pump 65 that is driven according to a control signal from the controller 20 is provided in the circulation pipe 64. The anode offgas from which water was separated by the gas-liquid separator 62 is delivered into the anode gas pipe 51, by means of the anode gas pump 65. In this fuel cell system 100, the anode offgas containing hydrogen is circulated, and supplied again to the fuel cell stack 10, for improvement of the anode-gas use efficiency.

The cooling medium circulating unit 70 circulates a cooling medium via the fuel cell stack 10, so as to control the temperature of the fuel cell stack 10. The cooling medium circulating unit 70 includes a coolant supply pipe 71, coolant discharge pipe 72, radiator 73, coolant pump 74, three-way valve 75, bypass pipe 76, and temperature gauge 77. As a coolant, water, antifreeze liquid, such as ethylene glycol, air, or the like, may be used.

The coolant supply pipe 71 is connected to a coolant inlet in the fuel cell stack 10, and the coolant discharge pipe 72 is connected to a coolant outlet of the fuel cell stack 10. The radiator 73, which is connected to the coolant discharge pipe 72 and the coolant supply pipe 71, cools the cooling medium flowing in from the coolant discharge pipe 72, with air blow of an electric fan, for example, and discharges the cooled medium to the coolant supply pipe 71. The coolant pump 74 is provided in the coolant supply pipe 71, and feeds the coolant under pressure to the fuel cell stack 10. The three-way valve 75 adjusts the flow rate of the coolant to the radiator 73 and the bypass pipe 76. The temperature gauge 77 is connected to the coolant discharge pipe 72, and measures the temperature of the coolant discharged from the fuel cell stack 10. The temperature measured by the temperature gauge 77 is substantially equal to the temperature of the fuel cell stack 10.

The DC/DC converter 80 raises the output voltage of the fuel cell stack 10, and supplies it to the PCU 81. The PCU 81 incorporates an inverter, and supplies electric power to the load 82, via the inverter, under control of the controller 20. The PCU 81 also limits electric current of the fuel cell stack 10, under control of the controller 20. An ammeter 85 that measures the current of the fuel cell stack 10 is provided between the fuel cell stack 10 and the DC/DC converter 80.

The voltage detector 84 detects the voltage of the fuel cell stack 10. In this embodiment, the voltage detector 84 calculates the average cell voltage from the voltage of the fuel cell stack 10. The "average cell voltage" is a value obtained by dividing a voltage across opposite ends of the fuel cell stack 10 by the number of the unit cells 11.

The ammeter 85 measures the output current value of the fuel cell stack 10. The impedance measuring unit 83 measures alternating-current impedance of the fuel cell stack 10, using the voltage detector 84 and the ammeter 85, and sends its measurement value to the controller 20.

Electric power of the fuel cell stack 10 is supplied to the load 82, such as a traction motor (not shown) for driving wheels (not shown), and the above-mentioned air compressor 33, anode gas pump 65, and various valves, via a power supply circuit including the PCU 81.

Figure 2:
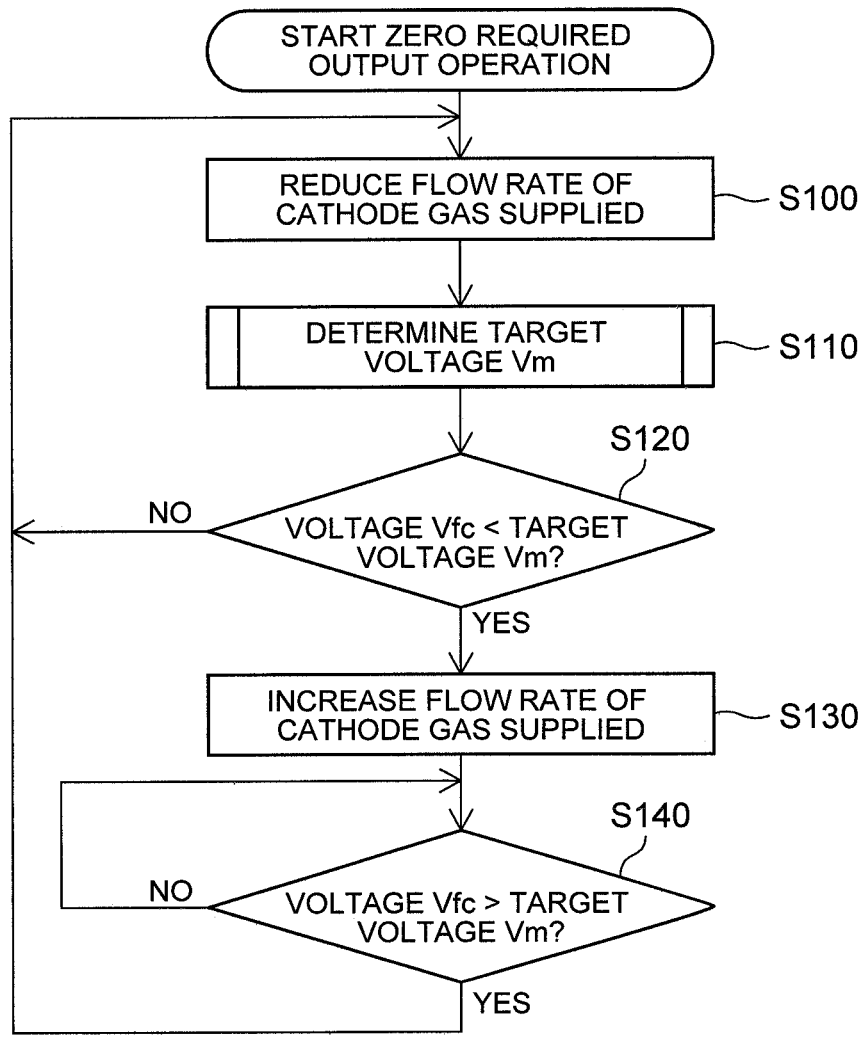
FIG. 2 is a flowchart illustrating one example of the procedure of cathode gas supply control.

The flowchart of FIG. 2 illustrates one example of the procedure of cathode gas supply control according to this embodiment. The routine of FIG. 2 is started when the fuel cell system 100 shifts from normal operation to zero required output operation. The "zero required output operation" is an operating mode of the fuel cell system 100 established when electric power which the ECU 21 requires the fuel cell stack 10 to generate is equal to zero. The "zero required output operation" will also be called "intermittent operation". During zero required output operation, small current may be generated from the fuel cell stack 10, so as to prevent the voltage of the unit cell 11 from being equal to an open circuit voltage. In the zero required output operation, electric power for each device is supplied from another power supply (not shown), such as a secondary battery. The "zero required output operation" also includes the case where electric power generated by the fuel cell stack 10 is charged into a secondary battery, or the like, without being used for driving the load 82, such as a motor. In the zero required output operation, accessories are stopped as far as possible, for improvement of the fuel efficiency. In particular, it is preferable to stop the air compressor 33 as far as possible during zero required output generation, because a large amount of electric power is consumed by the air compressor 33.

The controller 20 starts cathode gas supply control shown in FIG. 2 when zero required output operation starts. The controller 20 finishes the control of FIG. 2, when a command to stop zero required output operation is generated, more specifically, when electric power which the ECU 21 requires the fuel cell stack 10 to generate ceases to be zero, namely, when the ECU 21 requires the fuel cell stack 10 to generate electric power.

In step S100, the controller 20 reduces the flow rate of cathode gas supplied to the fuel cell stack 10. In this embodiment, the air compressor 33 is stopped, and supply of cathode gas is stopped. More specifically, the flow rate of cathode gas supplied to the fuel cell stack 10 by the air compressor 33 is set to zero. It is thus preferable to stop the air compressor 33, in terms of improvement in the fuel efficiency. It is also preferable, in terms of improvement in the fuel efficiency, that the flow rate of anode gas supplied is set to zero. Various methods can be employed, for reducing the flow rate of cathode gas supplied to the fuel cell stack 10, without stopping supply of cathode gas. For example, the flow rate of cathode gas supplied to the fuel cell stack 10 may be reduced by controlling the opening of the shunt valve 36, while keeping the air compressor 33 in a driven state.

Then, the controller 20 determines a target voltage Vm of the average cell voltage in step S110. This process will be called "target voltage determining process". The target voltage Vm is preferably set to be higher than 0V, and is more preferably set to a value equal to or higher than 0.6V and equal to or lower than 0.85V. Details of the target voltage determining process will be described later.

Then, in step S120, the controller 20 obtains the average cell voltage Vfc, and determines whether the average cell voltage Vfc is lower than the target voltage Vm. When the average cell voltage Vfc is lower than the target voltage Vm, the controller 20 proceeds to step S130, to increase the flow rate of cathode gas supplied to the fuel cell stack 10. In this embodiment, operation of the air compressor 33 is started, and supply of cathode gas is resumed. The flow rate of cathode gas supplied at this time is empirically determined in advance, and may be set as desired. The flow rate of cathode gas supplied in step S130 may also be determined, based on a map or function that defines the relationship between conditions of the fuel cell stack 10 and the flow rate of cathode gas. On the other hand, when the average cell voltage Vfc is equal to or higher than the target voltage Vm, the controller 20 returns to step S100. Namely, supply of the cathode gas is reduced or kept stopped, until the average cell voltage Vfc becomes lower than the target voltage Vm. In this connection, step S110 may be executed only when the routine of FIG. 2 is executed for the first time.

After increasing the flow rate of cathode gas supplied to the fuel cell stack 10 in step S130, the controller 20 obtains the average cell voltage Vfc again, and determines whether the average cell voltage Vfc is higher than the target voltage Vm. When the average cell voltage Vfc is higher than the target voltage Vm, the controller 20 returns to step S100, and reduces the flow rate of cathode gas supplied to the fuel cell stack 10. In this embodiment, the controller 20 stops the air compressor 33, and stops supply of cathode gas. On the other hand, when the average cell voltage Vfc is equal to or lower than the target voltage Vm, the controller 20 returns to step S140, and continues supply of cathode gas. Thus, in steps S130, S140, the flow rate of cathode gas supplied is temporarily increased until the average cell voltage Vfc exceeds the target voltage Vm.

As the target voltage Vm used in step S140, a value higher than the target voltage Vm used in step S120 may be used. However, the target voltage Vm used in step S140 and the target voltage Vm used in step S120 are preferably set to the same value, so that control is more simplified. Between step S130 and step S140, a process of determining a target voltage again may be performed.

While the average cell voltage Vfc is used for making determinations in steps S120, S140 in the routine of FIG. 2, the voltage across the opposite ends of the fuel cell stack 10 may be used in place of the average cell voltage Vfc, for making determinations in step S120, S140. Since the average cell voltage Vfc is obtained by dividing the voltage across the opposite ends of the fuel cell stack 10 by the number of the unit cells 11, as described above, the determinations made based on the voltage across the opposite ends of the fuel cell stack 10 are equivalent to the determinations made based on the average cell voltage.

Figure 3:
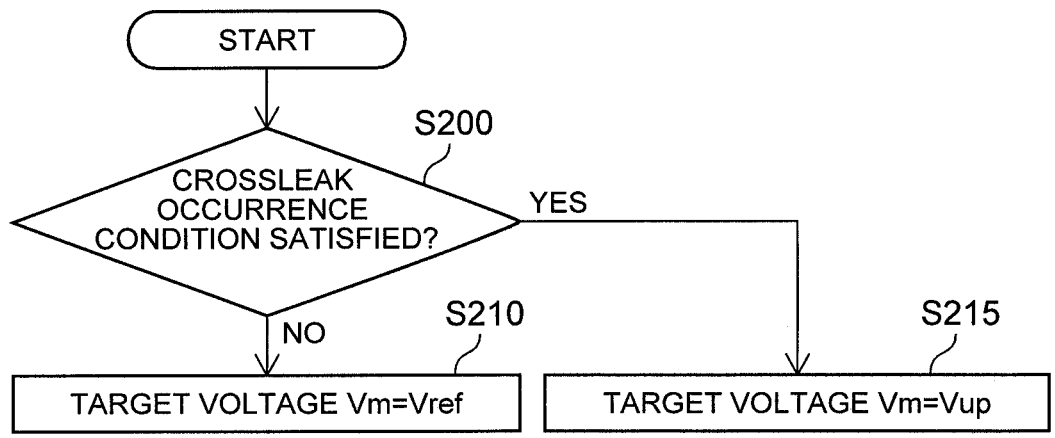
FIG. 3 is a flowchart illustrating one example of the procedure of a target voltage determining process.

The flowchart of FIG. 3 illustrates one example of the procedure of the target voltage determining process. Initially, the controller 20 determines in step S200 whether a condition (which will be referred to as "crossleak occurrence condition") under which crossleak, i.e., permeation of anode gas from the anode electrode to the cathode electrode in the unit cell 11, is likely to occur is satisfied. As the crossleak occurrence condition, any of the following conditions may be employed, for example.

First crossleak occurrence condition: the pressure of anode gas is higher than a predetermined threshold pressure.

Second crossleak occurrence condition: electric power required to be generated by the fuel cell system 100 immediately before the zero required output operation is started was equal to or larger than a predetermined threshold power.

Third crossleak occurrence condition: the temperature of the fuel cell stack 10 is higher than a predetermined threshold temperature.

Fourth crossleak occurrence condition: the relative humidity of the electrolyte membrane of the unit cell 11 of the fuel cell stack 10 is higher than a predetermined threshold humidity.

Fifth crossleak occurrence condition: a difference between the anode gas pressure and the cathode gas pressure is higher than a predetermined threshold value.

When the first crossleak occurrence condition is satisfied, the gas pressure on the anode side is high, in each unit cell 11; therefore, crossleak is likely to occur. If the average cell voltage Vfc is reduced in a condition where the anode gas pressure is high, the slope of reduction is likely to be large. Thus, when the condition where the anode gas pressure is high is used as a crossleak occurrence condition, it can be advantageously and correctly determined whether the cell voltage is excessively reduced. The threshold pressure can be empirically determined in advance. As the threshold pressure, a value in the range of 130 kPa to 160 kPa may be used, for example.

When the second crossleak occurrence condition is satisfied, a relatively large amount of anode gas has been supplied to the fuel cell stack 10, so as to generate relatively large electric power. Accordingly, in this case, the gas pressure on the anode electrode side of each unit cell 11 is high, and crossleak is likely to occur; therefore, the determination in step S200 can be made only based on the required electric power, without using the anode gas pressure. If the average cell voltage Vfc is reduced while the required electric power is large, the slope of the reduction is likely to be large. Thus, when the condition where the required electric power is large is used as a crossleak occurrence condition, it can be advantageously and correctly determined whether the cell voltage is excessively reduced. The threshold power can be empirically determined in advance. As the threshold power, a value in the range of 10 W to 20 W per unit cell 11 may be used, for example.

When the third crossleak occurrence condition is satisfied, the temperature is high in each unit cell 11; therefore, the velocity of vibration of molecules increases, and crossleak is likely to occur. The threshold temperature can be empirically determined in advance. For example, a value in the range of 70° C. to 90° C. may be used as the threshold temperature.

When the fourth crossleak occurrence condition is satisfied, the relative humidity of the electrolyte membrane is high, in each unit cell 11; therefore, the amount of water contained in the electrolyte membrane is large, and anode gas is likely to be dissolved in the water of the electrolyte membrane. As a result, crossleak is likely to occur. The relative humidity of the electrolyte membrane can be estimated from the alternating-current (AC) impedance. The AC impedance corresponds to a resistance value of the electrolyte membrane of the unit cell 11, and correlates with the water content of the electrolyte membrane. More specifically, the impedance value increases as the water content of the electrolyte membrane is smaller, namely, as the relative humidity of the electrolyte membrane is lower. On the contrary, the impedance value decreases as the water content of the electrolyte membrane is larger, namely, as the relative humidity of the electrolyte membrane is higher. The threshold humidity can be empirically determined in advance. For example, a value in the range of 60% to 70% may be used as the threshold humidity.

When the fifth crossleak occurrence condition is satisfied, the difference between the anode gas partial pressure on the anode electrode side and that on the cathode electrode side is large; therefore, crossleak is likely to occur. The threshold value can be empirically determined in advance. For example, a value in the range of 20 kPa to 30 kPa may be used as the threshold value.

The above conditions may be combined as appropriate, to be used as a crossleak occurrence condition. In this embodiment, the first crossleak occurrence condition is used.

In step S200 of FIG. 3, when the crossleak occurrence condition is not satisfied, the controller 20 proceeds to step S210, to determine a reference target voltage Vref as the target voltage Vm. The reference target voltage Vref can be empirically determined in advance, as a voltage that permits the fuel cell system 100 to return from the zero required output operation to the normal operation, without a response delay, when power is required to be generated. On the other hand, when the crossleak occurrence condition is satisfied, the controller 20 proceeds to step S215, to determine a value Vup that is higher than the reference target voltage Vref, as the target voltage Vm.

Figure 4:
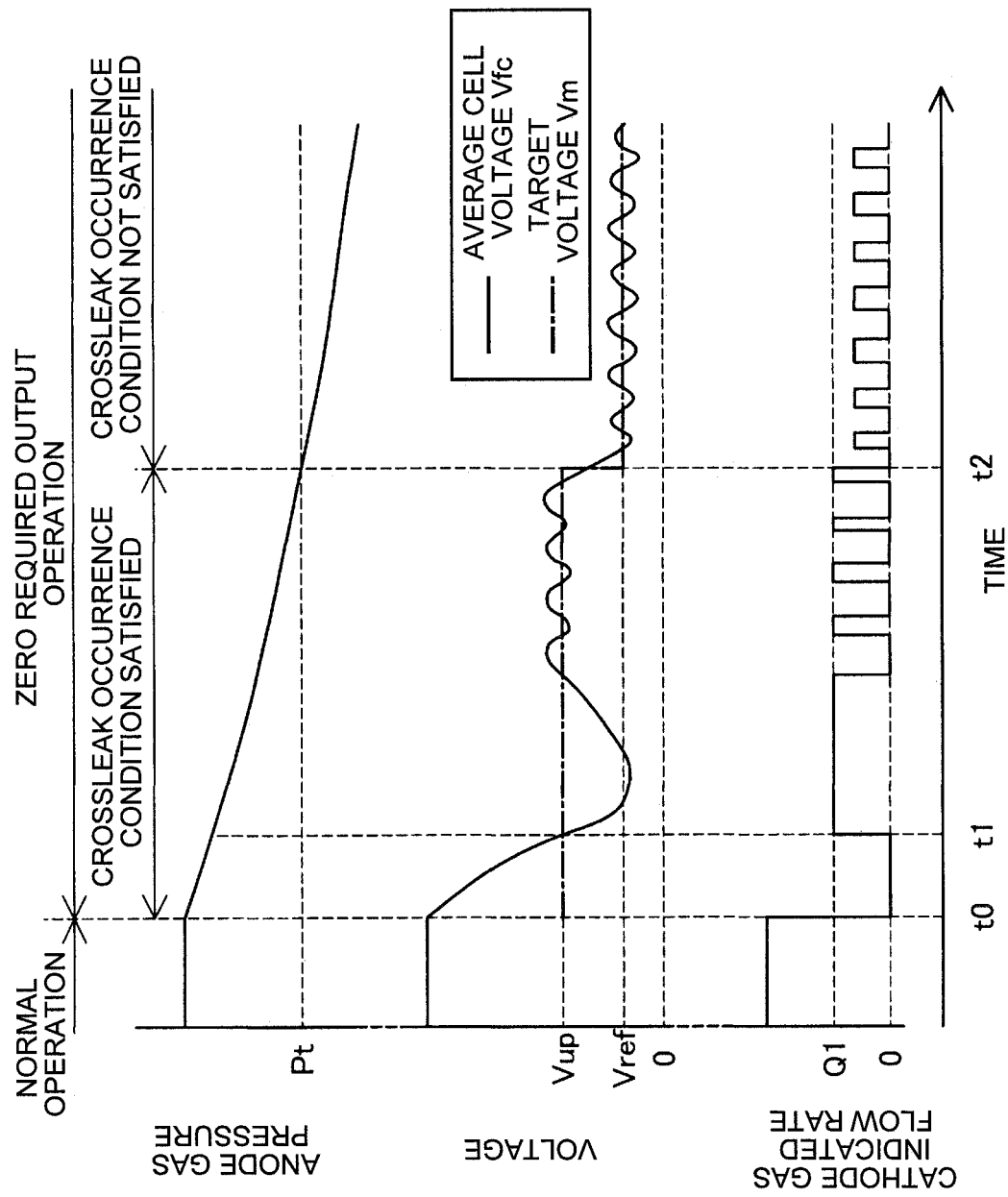
FIG. 4 is a view showing the relationship among the anode gas pressure, average cell voltage, and indicated flow rate of cathode gas.

The timing chart of FIG. 4 shows one example of the relationship among the anode gas pressure, average cell voltage Vfc, and the indicated flow rate of cathode gas. A graph in the upper section indicates change of the anode gas pressure, and a graph in the middle section indicates changes of the average cell voltage Vfc and the target voltage Vm. A graph in the lower section indicates change of the indicated flow rate (which will be referred to as "cathode gas indicated flow rate") of the flow rate of cathode gas supplied. As shown in FIG. 4, the controller 20 switches the fuel cell system 100 from normal operation to zero required output operation, at time t0. In the example of FIG. 4, power generation is stopped in the fuel cell stack 10, and the cathode gas indicated flow rate is set to zero. When the cathode gas indicated flow rate is equal to zero, operation of the air compressor 33 is stopped.

As shown in the graph in the upper section of FIG. 4, the anode gas pressure gradually decreases, due to crossleak of anode gas, from time t0 at which the fuel cell system 100 switched to zero required output operation. Then, at time t2, the anode gas pressure is reduced to a threshold pressure Pt based on which it is determined whether the crossleak occurrence condition is satisfied.

As shown in the graph in the middle section of FIG. 4, when the fuel cell system 100 switches from normal operation to zero required output operation, in a situation where crossleak is likely to occur, the average cell voltage Vfc is rapidly reduced. If the average cell voltage Vfc is excessively reduced, the performance of the unit cell 11 may deteriorate. Therefore, in the example of FIG. 4, at time t1 at which the average cell voltage Vfc becomes lower than the target voltage Vm, the controller 20 resumes supply of cathode gas to the fuel cell stack 10 by use of the air compressor 33. Thus, the average cell voltage Vfc can be made less likely or unlikely to be excessively reduced, by controlling supply of cathode gas, more specifically, by setting the target voltage Vm to the value Vup higher than the reference target voltage Vref, so that supply of cathode gas is started at an earlier point in time t1.

As shown in the graph in the lower section of FIG. 4, supply of cathode gas is stopped in a period from time t0 to time t1; thus the indicated air flow rate is set to zero. The controller 20 executes step S130 of FIG. 2 (resumes cathode gas supply in the example of FIG. 4) at time t1, and executes control of steps S100 to step S140 in each control cycle. As a result, the flow rate of cathode gas supplied is intermittently increased. After time t2, the crossleak occurrence condition is not satisfied; therefore, in step S110 of FIG. 2, the target voltage Vm is set to the reference target voltage Vref, and control for intermittently increasing the flow rate of cathode gas supplied is performed. In this example of FIG. 4, the indicated flow rate of cathode gas after time t2 at which the crossleak occurrence condition ceases to be satisfied is set to a value smaller than the cathode gas indicated flow rate Q1 in the period from time t1 to time t2, in which the crossleak occurrence condition is satisfied. However, the disclosure is not limited to this, but the cathode gas indicated flow rate may be determined as desired.

According to the fuel cell system 100 of this embodiment, when the crossleak occurrence condition is satisfied, the controller 20 sets the target voltage Vm to a value higher than that in the case where the crossleak occurrence condition is not satisfied, and performs cathode gas supply control for increasing the average cell voltage Vfc. Therefore, the point in time at which the flow rate of cathode gas supplied is increased is advanced (i.e., the flow rate of cathode gas is increased at the earlier time), and the cell voltage is less likely or unlikely to be reduced excessively.

Also, the crossleak occurrence condition used in this embodiment is that the anode gas pressure is higher than the predetermined threshold pressure; therefore, occurrence of crossleak can be easily detected.

B. Second Embodiment

Figure 5:
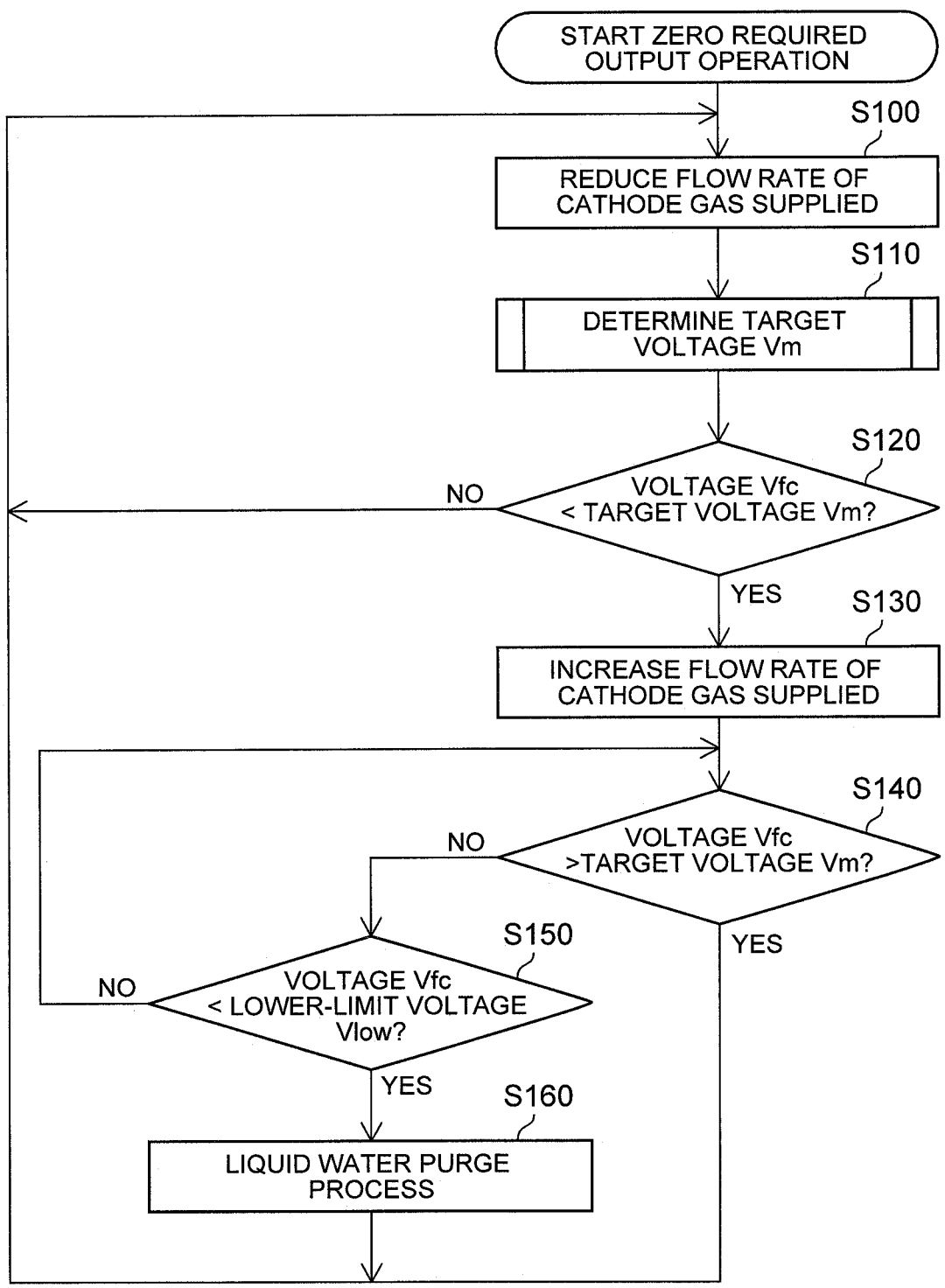
FIG. 5 is a flowchart illustrating one example of the procedure of a target voltage determining process according to a second embodiment.

The flowchart of FIG. 5 illustrates one example of the procedure of cathode gas supply control according to a second embodiment. The configuration of a fuel cell system of the second embodiment is identical with that of the fuel cell system of the first embodiment, and will not be described herein. The cathode gas supply control of the second embodiment is different from that of the first embodiment in that a liquid water purge process is performed when liquid water is accumulated, but is identical with that of the first embodiment in the other steps. The liquid water purge process is a scavenging process for reducing water that remains in the fuel cell stack 10, and water deposited on pipes, valves, etc. of the fuel cell system 100, by controlling respective constituent parts of the fuel cell system 100.

In the above first embodiment, after determining that the average cell voltage Vfc is lower than the target voltage Vm in step S140, the controller 20 returns to step S140, and continues to supply cathode gas. In the second embodiment, after determining that the average cell voltage Vfc is lower than the target voltage Vm in step S140, the controller 20 performs the liquid water purge process as needed, according to steps S150, S160.

In step S140, the controller 20 obtains the average cell voltage Vfc again. When the obtained average cell voltage Vfc is equal to or lower than the target voltage Vm, the controller 20 proceeds to step S150, and determines whether the average cell voltage Vfc obtained in step S140 is lower than the lower-limit voltage Vlow. The lower-limit voltage Vlow can be empirically determined in advance, as a voltage value based on which it is determined that liquid water is accumulated in the fuel cell stack 10 (for example, a voltage value at which the catalyst of the unit cell 11 switches between oxidation and reduction). The lower-limit voltage Vlow is a value equal to or higher than 0.4V and equal to or lower than 0.7V, and is set to a value lower than the target voltage Vm used in step S140. When the average cell voltage Vfc is lower than the lower-limit voltage Vlow, the controller 20 proceeds to step S160, and performs the liquid water purge process. On the other hand, when the average cell voltage Vfc is equal to or higher than the lower-limit voltage Vlow, the controller 20 returns to step S140, and continues to supply cathode gas.

After performing the liquid water purge process in step S160, the controller 20 returns to step S100. In the liquid water purge process of this embodiment, the controller 20 controls the cathode gas supply unit 30 to excessively inject cathode gas into the fuel cell stack 10. For example, it is preferable to inject cathode gas for several seconds at a flow rate that is 10 times as large as the flow rate necessary to maintain the normal voltage, more specifically, the cathode gas indicated flow rate after time t2 when the crossleak occurrence condition is not satisfied, as shown in FIG. 4.

According to the fuel cell system 100 of this embodiment as described above, the controller 20 performs the purge process when accumulation of liquid water occurs. Thus, the cell voltage can be made less likely or unlikely to be excessively reduced.

C. Other Embodiments

The configuration of a fuel cell system of a third embodiment as described below is identical with that of the fuel cell system of the first embodiment, and thus will not be described herein. The cathode gas supply control of the third embodiment is different from that of the first embodiment in the relationship between the anode gas pressure and the target voltage Vm in the target voltage determining process, but is identical with that of the first embodiment in the other steps.

Figure 6:
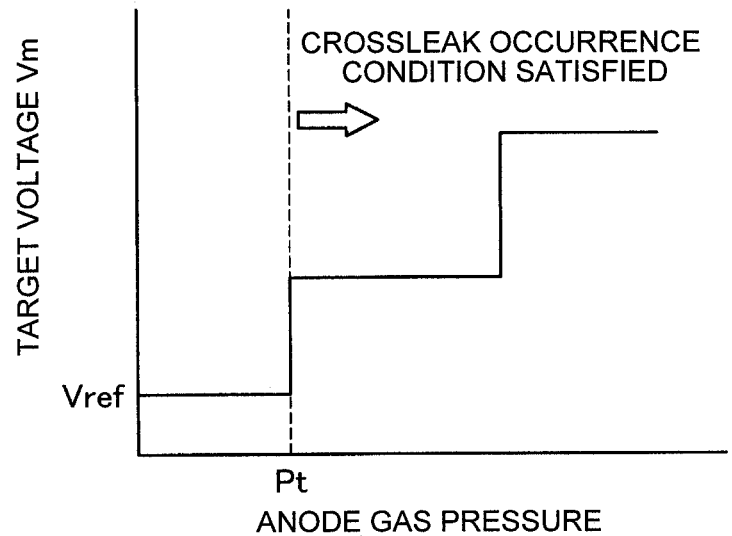
FIG. 6 is a graph showing the relationship between the anode gas pressure and the target voltage according to a third embodiment.

The graph of FIG. 6 shows the relationship between the anode gas pressure and the target voltage Vm used in the target voltage determining process in the third embodiment. In this example, when the anode gas pressure is equal to or higher than the threshold pressure Pt at or above which the crossleak occurrence condition is satisfied, the slope of reduction of the average cell voltage Vfc immediately after switching to the zero required output operation is steeper as the anode gas pressure is higher; therefore, the target voltage Vm is set to a larger value as the anode gas pressure is higher. While the target voltage Vm is set to one of three values selected according to the anode gas pressure in the third embodiment, the target voltage Vm may be set in a different manner. With the fuel cell system 100 thus configured, since the target voltage Vm is set to a larger value as the anode gas pressure increases, the cell voltage can be effectively made less likely or unlikely to be excessively reduced.

Figure 7:
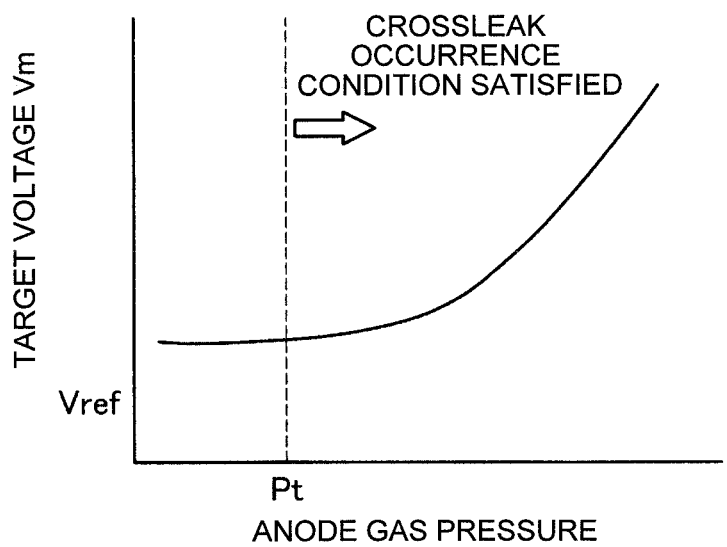
FIG. 7 is a graph showing the relationship between the anode gas pressure and the target voltage according to a fourth embodiment.

The graph of FIG. 7 shows the relationship between the anode gas pressure and the target voltage Vm used in the target voltage determining process according to a fourth embodiment. This example is similar to that of FIG. 6 in that the target voltage Vm is set to a larger value as the anode gas pressure is higher, but the relationship between the anode gas pressure and the target voltage Vm is represented by a continuous curve. With this configuration, too, since the target voltage Vm is set so as to increase as the anode gas pressure increases, the cell voltage can be made less likely or unlikely to be excessively reduced.

Figure 8:
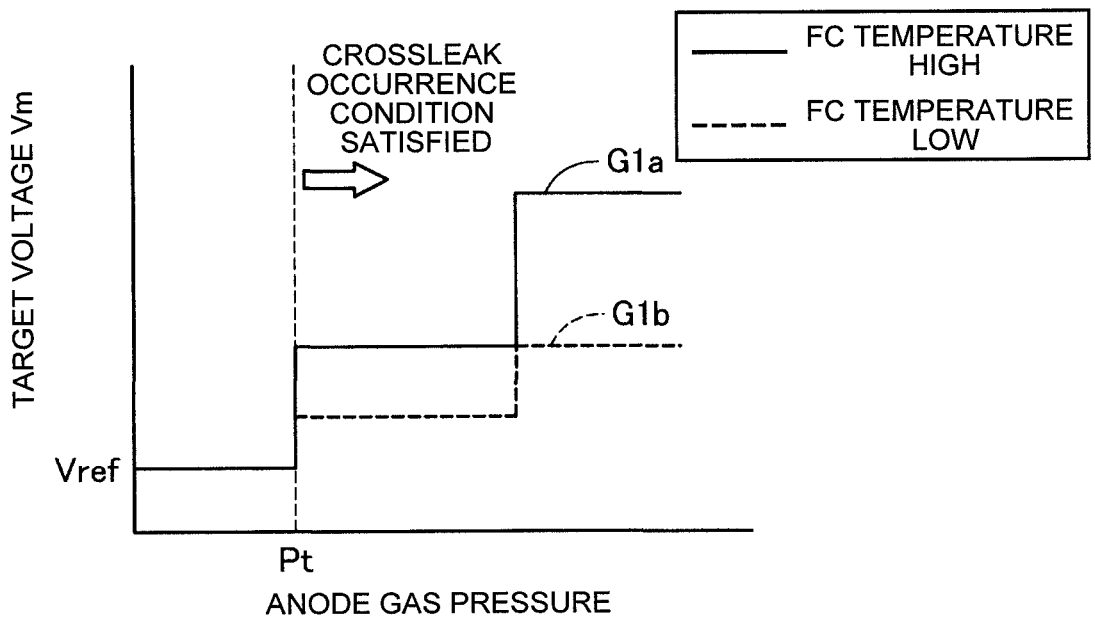
FIG. 8 is a graph showing the relationship between the anode gas pressure and the target voltage according to a fifth embodiment.

The graph of FIG. 8 shows the relationship between the anode gas pressure and the target voltage Vm used in the target voltage determining process according to a fifth embodiment. This example is similar to that of FIG. 6 in that the target voltage Vm is set to a larger value as the anode gas pressure is higher, but the relationship between the anode gas pressure and the target voltage Vm is determined according to the temperature of the fuel cell stack 10. In FIG. 8, graph G1a indicates the relationship between the anode gas pressure and the target voltage Vm when the temperature of the fuel cell stack 10 is high, and graph G1b indicates the relationship between the anode gas pressure and the target voltage Vm when the temperature of the fuel cell stack 10 is low. A criterial temperature based on which it is determined whether the temperature of the fuel cell stack 10 is high or low is empirically determined in advance, and may be determined as desired. Comparison between the graph G1a and the graph G1b finds that the target voltage Vm of the graph G1b is lower than that of the graph G1a. Thus, the target voltage Vm is set to a higher value when the temperature of the fuel cell stack 10 is high, than that in the case where the temperature is low. The graph G1a and the graph G1b may be identical with each other when the anode gas pressure is equal to or lower than the threshold pressure Pt. With this configuration, too, the target voltage Vm is set so as to increase as the anode gas pressure increases, in the range in which the crossleak occurrence condition is satisfied, so that the cell voltage can be effectively made less likely or unlikely to be excessively reduced.

Figure 9:
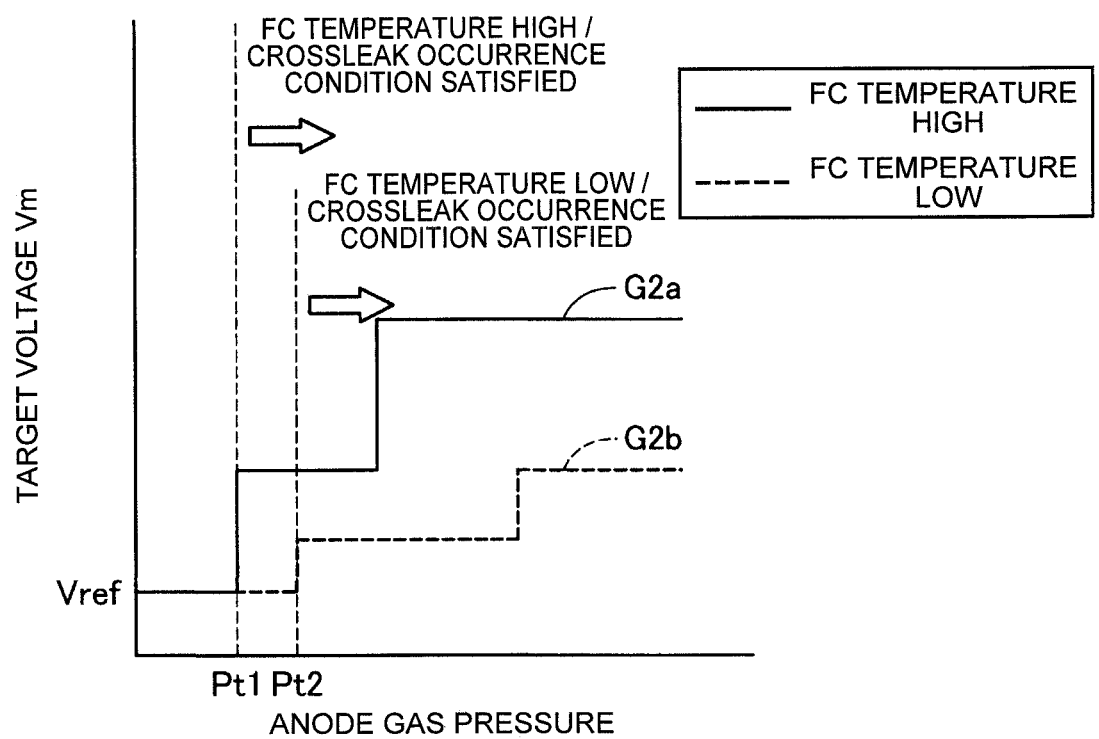
FIG. 9 is a graph showing the relationship between the anode gas pressure and the target voltage according to a sixth embodiment.

The graph of FIG. 9 shows the relationship between the anode gas pressure and the target voltage Vm used in the target voltage determining process according to a sixth embodiment. This example is similar to that of FIG. 8 in that the relationship between the anode gas pressure and the target voltage Vm is determined according to the temperature of the fuel cell stack 10, and the target voltage Vm is set to a larger value as the anode gas pressure is higher. However, in the example of FIG. 9, threshold values of the anode gas pressure at which the value of the target voltage Vm changes are set depending on the temperature of the fuel cell stack 10. In FIG. 9, graph G2a indicates the relationship between the anode gas pressure and the target voltage Vm when the temperature of the fuel cell stack 10 is high, and graph G2b indicates the relationship between the anode gas pressure and the target voltage Vm when the temperature of the fuel cell stack 10 is low. Comparison between the graph G2a and the graph G2b finds that the threshold values of the anode gas pressure at which the value of the target voltage Vm changes are larger in the graph G2b, than those in the graph G2a. For example, the anode gas pressure as a threshold value of the crossleak occurrence condition is Pt1 in the graph G2a, and is Pt2 that is higher than Pt1, in the graph G2b. Also, the target voltage Vm is lower in the graph G2b. With this configuration, too, the target voltage Vm is set so as to increase as the anode gas pressure increases, in the range in which the crossleak occurrence condition is satisfied, so that the cell voltage can be effectively made less likely or unlikely to be excessively reduced.

In the embodiments shown in FIG. 8 and FIG. 9, the target voltage determining process is performed using the graphs in which the relationship between the anode gas pressure and the target voltage Vm differs according to the temperature of the fuel cell stack. Instead, the target voltage determining process may be performed using a graph in which the relationship between the anode gas pressure and the target voltage Vm differs, according to the relative humidity of the electrolyte membrane of each unit cell 11 of the fuel cell stack 10. More specifically, the target voltage Vm is set to a higher value when the relative humidity of the electrolyte membrane of each unit cell 11 of the fuel cell stack 10 is high, than that in the case where the relative humidity is low.

The present disclosure is not limited to the above embodiments, but may be implemented with various configurations, without departing from the scope thereof. For example, technical features in the embodiments, which correspond to technical features described in "SUMMARY", may be replaced with other features or combined as appropriate, so as to solve a part or the whole of the problems mentioned above, or achieve a part or the whole of the effects mentioned above. If there is any technical feature that is not described as being essential in this specification, the technical feature may be deleted as appropriate.

What is claimed is:

1. A fuel cell system comprising:
a fuel cell stack having a plurality of unit cells;
an anode gas supply unit that supplies anode gas to the fuel cell stack;
a cathode gas supply unit that supplies cathode gas to the fuel cell stack;
a voltage detector that detects a voltage of the fuel cell stack;
a pressure measuring unit that measures an anode gas pressure of the fuel cell stack; and
a controller configured to control the anode gas supply unit and the cathode gas supply unit, wherein
the controller is programmed to perform cathode gas supply control to raise an average cell voltage of the fuel cell stack by increasing supply of the cathode gas to the fuel cell stack by the cathode gas supply unit, when electric power required to be generated by the fuel cell stack is equal to zero and the average cell voltage is lower than a predetermined target voltage, and
while performing the cathode gas supply control, the controller is programmed to:
determine whether a predetermined condition indicating that crossleak is likely to occur is satisfied, wherein the predetermined condition comprises a condition that the anode gas pressure is higher than a predetermined threshold pressure, the crossleak representing permeation of the anode gas from an anode electrode to a cathode electrode in each of the unit cells,
set the target voltage of the average cell voltage when the predetermined condition is not satisfied, to a reference target voltage, and
set the target voltage of the average cell voltage when the predetermined condition is satisfied, to a value that is higher than the reference target voltage,
wherein, while performing the cathode gas supply control, the controller is programmed to set the target voltage of the average cell voltage to a higher value when the anode gas pressure is higher than the threshold pressure, than the target voltage of the average cell voltage in a case where the anode gas pressure is lower than the threshold pressure.

2. A fuel cell system comprising:
a fuel cell stack having a plurality of unit cells;
an anode gas supply unit that supplies anode gas to the fuel cell stack;
a cathode gas supply unit that supplies cathode gas to the fuel cell stack;
a voltage detector that detects a voltage of the fuel cell stack; and
a controller configured to control the anode gas supply unit and the cathode gas supply unit, wherein
the controller is programmed to perform cathode gas supply control to raise an average cell voltage of the fuel cell stack by increasing supply of the cathode gas to the fuel cell stack by the cathode gas supply unit, when electric power required to be generated by the fuel cell stack is equal to zero and the average cell voltage is lower than a predetermined target voltage, and
while performing the cathode gas supply control, the controller is programmed to:
determine whether a predetermined condition indicating that crossleak is likely to occur is satisfied, wherein the predetermined condition comprises a condition that the electric power required to be generated by the fuel cell stack immediately before the required electric power is reduced to zero is equal to or larger than a predetermined threshold power, the crossleak representing permeation of the anode gas from an anode electrode to a cathode electrode in each of the unit cells,
set the target voltage of the average cell voltage when the predetermined condition is not satisfied, to a reference target voltage, and
set the target voltage of the average cell voltage when the predetermined condition is satisfied, to a value that is higher than the reference target voltage.

3. A method of controlling a fuel cell system having a fuel cell stack having a plurality of unit cells, the method comprising:
performing cathode gas supply control to raise an average cell voltage of the fuel cell stack by increasing supply of cathode gas to the fuel cell stack, when electric power required to be generated by the fuel cell stack is equal to zero and the average cell voltage is lower than a predetermined target voltage,
wherein performing the cathode gas supply control comprises:
determining whether a predetermined condition indicating that crossleak is likely to occur is satisfied, the predetermined condition comprising a condition that an anode gas pressure of the fuel cell stack is higher than a predetermined threshold pressure, wherein the crossleak represents permeation of anode gas from an anode electrode to a cathode electrode in each of the unit cells of the fuel cell stack,
setting the target voltage of the average cell voltage when the predetermined condition is not satisfied, to a reference target voltage, and
setting the target voltage of the average cell voltage when the predetermined condition is satisfied, to a value that is higher than the reference target voltage,
wherein, during the performing of the cathode gas supply control, the target voltage of the average cell voltage is set to a higher value when the anode gas pressure is higher than the threshold pressure, than the target voltage of the average cell voltage in a case where the anode gas pressure is lower than the threshold pressure.

4. A method of controlling a fuel cell system having a fuel cell stack having a plurality of unit cells, the method comprising:
performing cathode gas supply control to raise an average cell voltage of the fuel cell stack by increasing supply of cathode gas to the fuel cell stack, when electric power required to be generated by the fuel cell stack is equal to zero and the average cell voltage is lower than a predetermined target voltage,
wherein performing the cathode gas supply control comprises:

determining whether a predetermined condition indicating that crossleak is likely to occur is satisfied, wherein the predetermined condition comprises a condition that the electric power required to be generated by the fuel cell stack immediately before the required electric power is reduced to zero is equal to or larger than a predetermined threshold power, the crossleak representing permeation of anode gas from an anode electrode to a cathode electrode in each of the unit cells of the fuel cell stack, setting the target voltage of the average cell voltage when the predetermined condition is not satisfied, to a reference target voltage, and setting the target voltage of the average cell voltage when the predetermined condition is satisfied, to a value that is higher than the reference target voltage.

* * * * *